(12) United States Patent
Yuksel et al.

(10) Patent No.: US 12,348,271 B2
(45) Date of Patent: Jul. 1, 2025

(54) MULTI-ELEMENT LASER-BASED FULL-DUPLEX FREE-SPACE OPTICAL TRANSCEIVER

(71) Applicant: University of Central Florida Research Foundation, Inc., Orlando, FL (US)

(72) Inventors: Murat Yuksel, Orlando, FL (US); A F M Saniul Haq, Orlando, FL (US); Patrick De La Llana, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 399 days.

(21) Appl. No.: 17/847,735

(22) Filed: Jun. 23, 2022

(65) Prior Publication Data

US 2023/0006742 A1 Jan. 5, 2023

Related U.S. Application Data

(60) Provisional application No. 63/214,464, filed on Jun. 24, 2021.

(51) Int. Cl.
*H04B 10/50* (2013.01)
*H04B 10/112* (2013.01)

(52) U.S. Cl.
CPC ....... *H04B 10/503* (2013.01); *H04B 10/1129* (2013.01)

(58) Field of Classification Search
None
See application file for complete search history.

(56) References Cited

U.S. PATENT DOCUMENTS

2008/0008471 A1 * 1/2008 Dress ............... G06E 3/006
398/118

OTHER PUBLICATIONS

Abul F. M. S. Haga et al. "Weather-limited in-band full-duplex transceiver model for free-space optical communication" Opt. Eng., May 2020, vol. 59(5), Optical Engineering. Florida, United States.
A F M Saniul Haq et al. "Asynchronous LOS Discovery Algorithm for Aerial Nodes Using In-band Full-Duplex Transceivers" Dec. 9-12, 2019. pp. 26-27, CoNEXT '19. Orlando, FL, USA.
A F M Saniul Haq et al. "A Prototype of In-Band Full-Duplex Free-Space Optical Transceiver" 2018.Orlando, FL, USA.
(Continued)

*Primary Examiner* — David W Lambert
(74) *Attorney, Agent, or Firm* — Molly L. Sauter; Smith & Hopen, P.A.

(57) ABSTRACT

A free-space optical (FSO) transceiver having an optimum number of transmitters and receivers positioned in optimum locations on the transceiver plane to ensure maximum signal-to-interference and noise ratio (SINR) and to minimize the effects of vibration of the mobile platform and atmospheric turbulence. A defocal lens assembly having an adjustable distance between the transmitters and the lens assembly is further provided to maximize the optical coupling efficiency and the vibration tolerance by adjusting the defocusing length.

14 Claims, 11 Drawing Sheets

(56) References Cited

OTHER PUBLICATIONS

Mahmudur Khan et al. "GPS-Free Maintenance of A Free-Space-Optical Link Between Two Autonomous Mobiles" Jun. 2017. pp. 1644-1657, vol. 16, No. 6, IEEE Transactions on Mobile Computing. USA.

Mahmudur Khan et al. "Autonomous Alignment of Free-Space-Optical Links Between UAVs" Sep. 11, 2015. pp. 36-40, HotWireless'15. Paris, France.

Thomas G. Spence et al. "Design of Broadband Planar Arrays Based on the Optimization of Aperiodic Tilings" Jan. 2008, pp. 76-85, vol. 56, No. 1, IEEE Transactions on Antennas and Propagation, USA.

Chunyi Chen et al. "Field-of-View Optimization of FSO Receiver using Real-coded Genetic Algorithm" 2010, pp. 459-462. International Conference on Artificial Intelligence and Computational Intelligence. Changchun, China.

Francisco J. Ares-Pena et al. "Genetic Algorithms in the Design and Optimization of Antenna Array Patterns" Mar. 1999, pp. 506-510, vol. 47, No. 3. IEEE Transactions on Antennas and Propagation.

\* cited by examiner

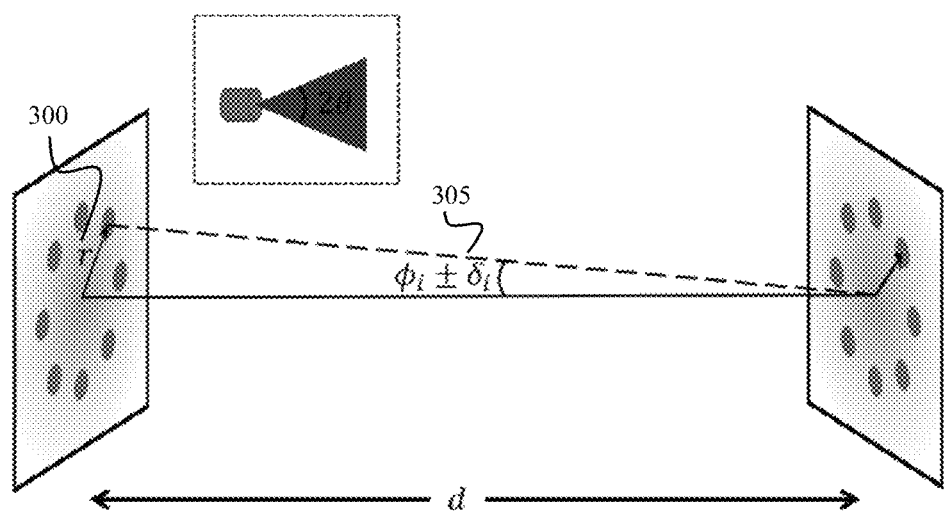
FIG. 3
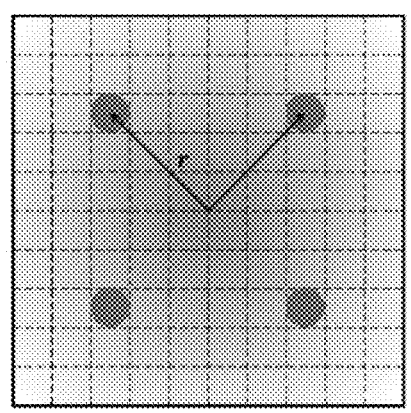 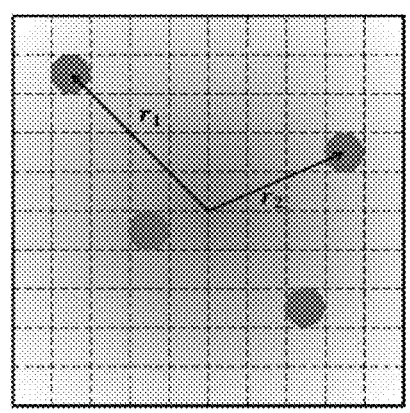
FIG. 4A  FIG. 4B

MULTI-ELEMENT LASER-BASED FULL-DUPLEX FREE-SPACE OPTICAL TRANSCEIVER

CROSS-REFERENCE TO RELATED APPLICATIONS

This application claims priority to U.S. Provisional Patent Application No. 63/214,464, filed on Jun. 24, 2021, and entitled, Multi-Element Laser-Based Full-Duplex Free-Space Optical Transceiver", the entirety of which is incorporated herein by reference.

BACKGROUND OF THE INVENTION

Increase in mobility and number of users triggered a sharp increase in wireless data demands for communication devices, sensor networks, and security protocols. The ever-increasing data demands for smartphones, peer-to-peer networks, and autonomous vehicles are over-crowding the legacy radio-frequency (RF) bands below 6 GHz and in immediate need of alternative bands, such as optical and millimeter wave (mmWave). High speed wireless networks for mobile applications use mostly RF-based Wi-Fi points nowadays, but the bandwidth and capacity mismatch with the fiber-optical backhaul network cannot deliver full potential of the system, which can be achieved by complementing, and in some cases replacing with free-space optical (FSO) networks.

FSO communication (FSOC) can enable high speed mobile ad hoc network for futuristic smart city implementations because of the high modulation speed, higher bandwidth, unlicensed spectrum, and secure directional beam propagation. The use of light emitting diodes (LEDs) and lasers for communication may ensure low cost, low power, dense packaging, and systems for high-speed communication between mobile and/or fixed nodes. Low divergence angle and moderate field-of-view (FOV) of the optical components lead to spatial reuse, multiple channels, and a multi-node system to reach wider range of coverage. However, direct line-of-sight (LOS) and weather-dependent beam propagation loss limit the applications of FSOC to indoor and short range (~100 m) outdoor applications.

Mobile FSO networks can be a useful solution for multi-node, high speed, short distance communication. Tactical ad hoc networks with requirement of high bandwidth and reduced probability of jamming and interception can greatly benefit from implementing nodes with FSO transceivers. Beyond these advantages, the network capacity can be significantly increased by utilizing the FSO transceivers in an in-band full-duplex (IBFD) manner. IBFD communication uses simultaneous signal transmission and reception in the same frequency band. Despite the disadvantages caused by self-interference (SI), full-duplex operation can aid in successfully dealing with the huge spectrum demands by increased channel capacity.

Some of the drawbacks of IBFD FSOC can be addressed by implementing multi-element transceiver nodes with capability of spatial reuse, beam steering, cognitive techniques for adaptive optimizations, and tolerance to mobility, vibration, sway, or tilt during communication. The single most key limitation of the mobile FSOC is to maintain the link under perturbation. The alignment of the transmitter and receiver might need to be compensated for vibration, sway, or tilt to ensure LOS. Intelligent design of a multi-element transceiver plane layout may minimize these loss components and maximize signal-to-interference-plus-noise ratio (SINR) for mobile FSOC links. Additionally, lens assemblies that address the issues of establishing a LOS optical link between mobile platforms, such as UAVs, autonomous vehicles, floating/flying base stations, and stationary building-top transceivers are needed.

However, in view of the art considered as a whole at the time the present invention was made, it was not obvious to those of ordinary skill in the field of this invention how a multi-element laser-based full-duplex free-space optical transceiver could be designed and implemented.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

In various embodiments, a free-space optical (FSO) transceiver having an optimum number of transmitters and receivers positioned in optimum locations on the transceiver plane to ensure maximum signal-to-interference and noise ratio (SINR) and to minimize the effects of vibration of the mobile platform and atmospheric turbulence is provided. Additionally, a defocal lens assembly having an adjustable distance between the transmitters and the lens assembly is further provided to maximize the optical coupling efficiency and the vibration tolerance by adjusting the defocusing length.

In a particular embodiment, a free-space optical (FSO) transceiver includes a transceiver plane, and a plurality of transmitters positioned on the transceiver plane, wherein the plurality of transmitters occupy approximately 22% of the transceiver plane, the plurality of transmitters are substantially equally separated into one of four transceiver clusters on the transceiver plane, and wherein the four transceiver clusters are approximately equidistant from each other and from a center of the transceiver plane. The FSO transceiver further includes, a plurality of receivers positioned on the transceiver plane, wherein the plurality of receivers occupy the transceiver plane not occupied by the plurality of transmitters and wherein the plurality of receivers are positioned within an interior of the four transceiver clusters.

In a specific embodiment, the plurality of transmitters includes a first set of transmitters positioned to form a square having four corners and an interior area and a second set of transmitters positioned within the interior area at one of the four corners of the square. In this embodiment, the plurality of receivers are positioned within the interior area of the square.

In an exemplary embodiment, the transceiver plane comprises a 10×10 array, wherein the first set of transmitters is 20 transmitters to form the square within the 10×10 array and the second set of transmitters is 4 transmitters, wherein 1 transmitter of the second set is positioned within the interior at each of the four corners of the square.

FSO transceiver may further include a defocal lens assembly positioned to receive a beam from one or more of the plurality of transmitters, wherein an optical link distance between the defocal lens assembly and the one or more of the plurality of transmitters is adjustable. Adjusting the optical link distance serves to maximize an optical coupling between the plurality of transmitters and a receiver optically linked to the FSO transceiver and to maximize vibration tolerance of an optical link between the plurality of transmitters and a receiver optically linked to the FSO transceiver.

In an additional embodiment, the present invention provides a computer implemented method for optimizing multi-element tiling in a full-duplex free-space optical (FSO) transceiver. The method includes, simulating a communication link between a first full-duplex FSO transceiver and a second full-duplex FSO transceiver, wherein the first full-duplex FSO transceiver and the second full-duplex FSO transceiver each comprise a same number of transmitters and a same number of receivers in a predetermined size transceiver array, calculating the signal-to-interference-plus-noise ratio (SINR) for the communication link, varying the number of transmitters of the first full-duplex FSO transceiver and the second full-duplex FSO transceiver and repeating calculating the SINR of the communication link until a maximum SINR is identified and selecting an optimum number of transmitters and receivers of the first full-duplex FSO transceiver and the second full-duplex FSO transceiver based upon the number of transmitters for the communication link having the maximum SINR. The method further includes, generating a plurality of possible positions for the optimum number of transmitters and receivers of the first full-duplex FSO transceiver and the second full-duplex FSO transceiver for the predetermined size transceiver array, calculating the SINR for the communication link for each of the plurality of possible positions and selecting an optimum positioning for the optimum number of transmitters and receivers based upon the possible position having the maximum SINR. The method may further include, positioning a defocal lens assembly to receive a beam from one or more of the optimum number of transmitters, wherein an optical link distance between the defocal lens assembly and the one or more of the optimum number of transmitters is adjustable.

As such, in various embodiments, the present invention provides a free-space optical (FSO) transceiver having an optimum number of transmitters and receivers positioned in optimum locations on the transceiver plane to ensure maximum signal-to-interference and noise ratio (SINR) and to minimize the effects of vibration of the mobile platform and atmospheric turbulence and a defocal lens assembly having an adjustable distance between the transmitters and the lens assembly is further provided to maximize the optical coupling efficiency and the vibration tolerance by adjusting the defocusing length.

BRIEF DESCRIPTION OF THE FIGURES

FIG. 3 is an illustration of the orientation of two communicating nodes after alignment.

FIG. 4A is an illustration of the positioning of transmitters within a transceiver plane wherein all the transmitters are equidistant from the center of the transceiver.

FIG. 4B is an illustration of the position of transmitters within a transceiver plane wherein all the transmitters are positions randomly.

DETAILED DESCRIPTION OF THE INVENTION

Figure 1:
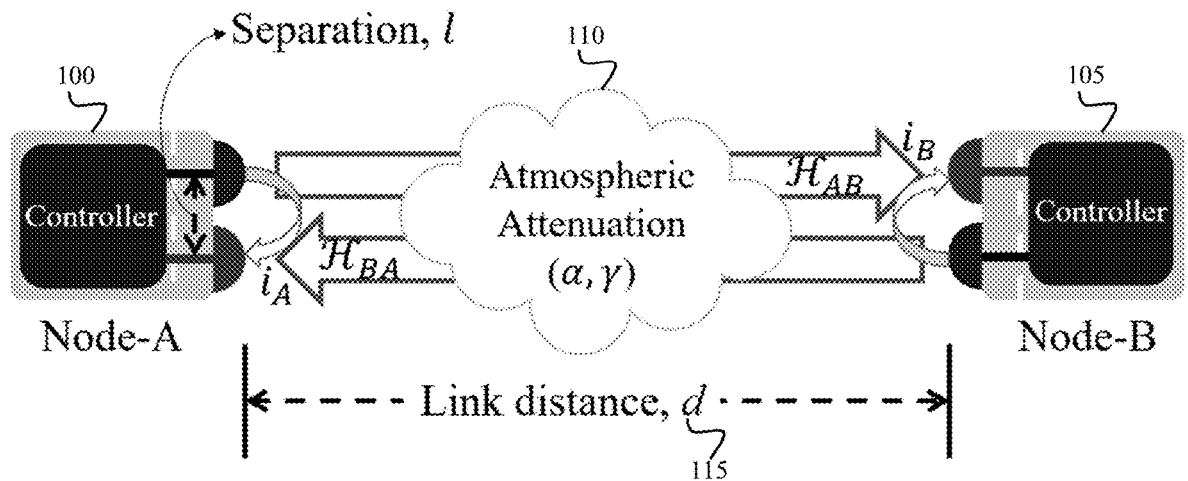
FIG. 1 is a block diagram illustrating an in-band full-duplex optical wireless link consisting of two nodes.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention. The invention accordingly comprises the features of construction, combination of elements, and arrangement of parts that will be exemplified in the disclosure set forth hereinafter and the scope of the invention will be indicated in the claims.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Mobile FSO networks can be a useful solution for multi-node, high speed, short distance communication. Tactical ad hoc networks having requirements for high bandwidth and reduced probability of jamming and interception can greatly benefit from implementing nodes with FSO transceivers. Beyond these advantages, the network capacity can be significantly increased by utilizing the FSO transceivers in an in-band full-duplex (IBFD) manner. IBFD communication utilizes simultaneous signal transmission and reception in the same frequency band. Despite the disadvantages resulting from self-interference (SI), full-duplex operation can aid in successfully dealing with the huge spectrum demands through increased channel capacity.

Some of the drawbacks of IBFD FSOC can be addressed by implementing multi-element transceiver nodes having the capability of spatial reuse, beam steering, cognitive techniques for adaptive optimizations, and tolerance to mobility, vibration, sway, or tilt during communication. The single biggest limitation of the mobile FSOC is the inability to maintain the link under perturbation. Direct line-of-sight (LOS) is required to establish secure directional FSO communication (FSOC) links which are highly susceptible to random and erratic movements of the mobile nodes as well as the turbulence that is present in the free-space medium. As such, the alignment of the transmitter and receiver may need to be adjusted to compensate for vibration, sway, or tilt to ensure direct LOS. In various embodiments, the present invention provides a framework for optimizing multi-element FSO transceiver tiling patterns to ensure maximal signal-to-interference and noise ratio (SINR) and to minimize the effects of vibration of the mobile platform and atmospheric turbulence. In this context, tiling is the physical positioning of the transmitter and receivers within the transceiver plane.

In particular, the embodiments of the present invention provide for the design and tiling of different elements, i.e., transmitters and receivers, on a transceiver plane to optimize IBFD communication throughput. Optimization techniques are provided to identify the optimum number of transmitters and tiling of the transmitters in a way that gives uninterrupted performance, even in the presence of vibration.

In a specific embodiment, an optimum transmit/receive area ratio for a square transceiver array layout is determined by the method of the present invention and the design of the transceiver of the present invention positions the transmitters on the transceiver plane to form an interior box surrounding a center square of receivers. The extra transmitters that do not form the exterior box are positioned on the interior of the four corners of the exterior box.

In a particular embodiment, a hardware prototype is designed using the optimum transmit/receive area ratio and a 10×10 square transceiver array layout with size, weight and power, cost, and geometric simplicity appropriate for a low-flying multi-copter drone. A full link margin analysis was completed for the 10×10 array, using commercial off-the-shelf components, with the same optimum transmit and receive combination. The range for the system was found to be ~150 m operating at 1 Mbps.

The present invention provides a method for determining optimum tiling of transmit/receive elements of a transceiver system to implement a directional wireless link in the optical spectrum for mobile settings, particularly for the emerging use of low-flying drones.

In various embodiments of the present invention, a genetic algorithm framework is proposed to explore optimized multi-element FSO transceiver tiling patterns to ensure maximal signal-to-interference and noise ratio (SINR) and to minimize the effects of vibration of the mobile platform and atmospheric turbulence. The design and tiling of different elements, including transmitters and receivers, on the transceiver plane are addressed to optimize IBFD communication throughput. Optimization techniques are also explored to find the optimum number of transmitters and tiling the optimized number of transmitters in a fashion that provides uninterrupted performance, even in the presence of vibration.

Even in the presence of self-interference (SI), full-duplex communication can provide at least 20% gain over half-duplex communication. Also, the effect of SI reduces significantly with increase in directionality of the transmitter and the receiver. Prior work on full-duplex FSOC have reported transceiver designs using out-of-band techniques and full-duplex indoor FSOC has been demonstrated for error-free (BER<$10^{-9}$) short range operation. In these designs, the transceiver used different optical wavelengths for uplink (1550:12 nm) and downlink (850 nm) channels, which makes it an out-of-band design. To suppress the SI for full-duplex operation, two separate bands are used for the transmitter and the receiver. A full-duplex visible light communication (VLC) system has been reported which implements sub-carrier multiplexing (SCM) and wavelength division multiplexing (WDM) techniques based on commercially available LEDs. Bit-error rate reported for 66 cm free-space delivery was 3:8 $10^{-3}$, but the use of red-green-blue (RGB) LEDs essentially make the design out-of-band.

In-band full-duplex (IBFD) free-space optical communication (FSOC) designs have recently received attention. An IBFD design for FSOC has been reported which implements communication between a stationary controller and a mobile node using beam reversibility and data erasure method. Even though this design implements full-duplex operation for the mobile node, the controller has a transmitter, but no receiver. Isolating the transmitter and the receiver of a node using a divider has been proposed, but no functional prototype has been demonstrated.

To improve link quality and provide higher throughput, a large number of transmitters with directional propagation characteristics over same link can be deployed for FSOC, especially to achieve higher aggregated bandwidth and link robustness due to spatial diversity. It has been shown that FSO mobile ad-hoc networks (FSO-MANETs) can be designed using optical antennas in spherical shapes, which can achieve angular diversity, spatial reuse, and multi-element incorporation. Alignment and mobility issues of multi-element FSO transceivers have been analyzed and modeled which focus on localization and tracking of users, LED assignments, and transmit power control for optimum operation. Additionally, a Line-of-Sight (LOS) alignment protocol has been employed to tackle the hand-off issue caused by the mobility of the receivers in a room using multi-element VLC link by optimizing link performance. In contrast, in the various embodiments of the present invention, the focus is on designing and tiling multiple elements on a single transceiver plane so that the best performance out of the established FSO link in terms of robustness against mobility can be achieved.

In the channel model shown in FIG. 1, the transmitter modulates data onto the instantaneous intensity of an optical beam. The present invention considers intensity modulated direct detection channels using On-Off Keying (OOK), which is widely employed in practical systems. The received photocurrent signal is related to the incident optical power by the detector responsivity R. The received signal y suffers from a fluctuation in signal intensity due to atmospheric turbulence and misalignment, as well as additive noise, and can be well modeled as:

$$y = hRx + n + i_s \tag{1}$$

where x is the transmitted signal intensity, h is the channel state, $i_s$ is the SI signal received at the receiver from its own transmitter, y is the resulting electrical signal, and n is signal-independent additive white Gaussian noise. The system block diagram consists of two nodes, A 100 and B 105, as presented in FIG. 1. It also shows the signal flow direction at the presence of atmospheric attenuation parameters $(\alpha, \gamma)$ 110, which will be discussed in detail later. The channel state h models the random attenuation of the propagation channel. In the present model, h arises due to three factors: path loss $h_l$, geometric spread and pointing errors $h_p$, and atmospheric turbulence $h_a$. The channel state can then be formulated as:

$$h = h_l h_p h_a \tag{2}$$

Note that $h_l$ is deterministic, and $h_p$ and $h_a$ are random with distributions, as discussed later. Since the time scales of these fading processes ($\approx 10^{-3}$-$10^{-2}$) are far larger than the bit interval ($\approx 10^{-9}$s), h is considered to be constant over a large number of transmitted bits. Notice that the use of interleaving to allow for averaging over a large number of fading states is impractical in this channel. This block fading channel is often termed as slow fading or nonergodic channel in which an h is chosen from the random ensemble according to distribution $f_h(h)$ and fixed over a long block of bits.

Optical fading can be attributed to several components of the channel and communication system design. Three major components of optical fading in the channel are atmospheric turbulence, free-space attenuation, and pointing error due to misalignment.

The attenuation of laser power through the atmosphere is described by the exponential Beers-Lambert Law as:

$$h_l(z) = \frac{P(z)}{P(0)} = \exp(-\alpha z) \tag{3}$$

where $h_l(z)$ is the loss over a propagation path of length z, P(z) is the laser power at distance z, and a is the attenuation coefficient. The attenuation $h_l$ is considered as a fixed scaling factor during a long period of time, and no randomness exists in its behavior. It depends upon the size and distribution of the scattering particles and the wavelength utilized. It can be expressed in terms of the visibility, which can be measured directly from the atmosphere.

By using Friis transmission equation, one can calculate the attenuation coefficient as:

$$\alpha = \frac{1}{d} \ln \frac{1}{G_T G_R T_A L_{FS}} \tag{4}$$

The value of a depends on the wavelength of the signal $\lambda$, the visibility range V, and the size distribution of the particle q in the atmosphere. The equation of atmospheric attenuation coefficient has been proposed in the form of:

$$\alpha = \frac{3.91}{V} \left(\frac{\lambda}{550\,\text{nm}}\right)^{-q} \tag{5}$$

where q is given by:

$$q = \begin{cases} 1.6; & V > 50\,\text{km} \\ 1.3; & 6\,\text{km} < V < 50\,\text{km} \\ 0.72 V^{\frac{1}{3}}; & V < 6\,\text{km} \end{cases} \tag{6}$$

Using equations 4-6, the free-space path loss components can be calculated with respect to the link distance (d) 115.

Figure 2:
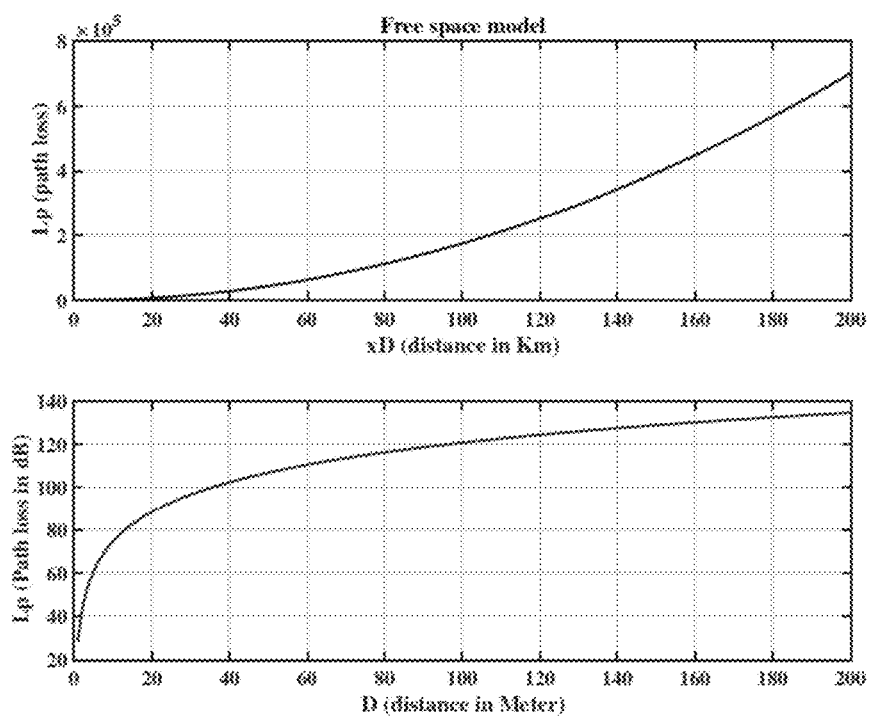
FIG. 2 is a graphical illustration of the path loss calculation for a free-space fading model.

The loss parameter model ($L_p$) is shown in FIG. 2. Loss of LOS or LOS alignment could result in significant channel fading due to point error loss. Wind, gust and thermal expansion of atmospheric medium results in path delay and/or pointing error. A statistical model to incorporate such pointing errors in terms of detector aperture, Gaussian beam width, and jitter and vibration variance is provided below.

The normalized spatial intensity distribution of the transmitted Gaussian beam is given by:

$$I_{beam}(\rho; z) = \frac{2}{\pi w_z^2} \exp\left(-\frac{2\|\rho\|^2}{w_z^2}\right) \tag{7}$$

where $\rho$ is the radical vector from the beam center and $w_z$ is the Gaussian beam waist at distance z, which can be written as:

$$w_z \approx w_0 \left[1 + \epsilon \left(\frac{\lambda z}{\pi w_0^2}\right)\right]^{1/2} \tag{8}$$

where, $w_0$ is the beam waist at z=0, $\epsilon = (1 + 2w_0^2/\rho_0^2(z))$, and coherent length, $\rho_0(z) = (0.55 C_n^2 k^2 z)^{-3/5}$.

If the center of the incident beam is misaligned by distance r along the detector plane, then the fraction of the power collected by the detector, $h_p(.)$, can be expressed as:

$$h_p(r; z) = \int_A I_{beam}(\rho - r; z) d\rho \tag{9}$$

where A is the area of the detector and $h_p$ is a function of radial misalignment angle when pointing error r 300 is present, as shown in FIG. 3 and FIG. 4. Due to symmetry in beam shape and detector area, the integral can be approximated by:

$$h_p(r;z) \approx A_0 \exp\left(-\frac{2r^2}{w_{z_{eq}}^2}\right) \quad (10)$$

where, $$A_0 = [\mathrm{erf}(v)]^2$$

$$w_{z_{eq}}^2 = w_z^2 \frac{\sqrt{\pi}\,\mathrm{erf}(v)}{2v\exp(-v^2)}$$

$$v = \frac{\sqrt{\pi}\,a}{\sqrt{2}\,w_z}$$

and a is the radius of a single receiver.

The noise components when an optical signal is received by the detector consist of various noise sources, including, but not limited to, thermal noise, background radiation and dark current. The equations for the noise equivalent power (NEP) of the optical components are given by:

$$P_{bg\_sn} = \frac{\sqrt{2qSP_{bg}B_{en}F}}{S} \quad (11)$$

$$P_{sig\_sn} = \frac{\sqrt{2qSP_{sig}B_{en}F}}{S} \quad (12)$$

$$P_{dark\_sn} = \frac{\sqrt{(2qI_{dark}G_{det}^2 F + 2qI_{dc})B_{en}}}{SG_{det}} \quad (13)$$

where $P_{bg}$ is the optical solar background noise, $P_{sig}$ is the optical power of the signal, $I_{dark}$ is the optical dark current, $I_{dc}$ is the DC dark current, $G_{det}$ is the detector current gain, $B_{en}$ is the effective noise bandwidth $$\left(=\frac{\pi B}{2}\right),$$

S is the radiant sensitivity of the detector (amp/watt), F is the excess noise factor, which is equal to 1 for photodiode, and q is the electronic charge. The total NEP is given by:

$$N_T = \sqrt{P_{bg\_sn}^2 + P_{sig\_sn}^2 + P_{dark\_cn}^2} \quad (14)$$

To design a short-range FSOC system using a laser as the transmitter, all the noise contributions need to be incorporated into the calculation. As the bit-rate requirement is increasing day-by-day, the receiver components and the circuit are required to be very sensitive and responsive. With the increase in sensitivity, the receiver noise budget is becoming smaller.

By using a residual SI model, residual SI power at nodes A and B are given by $$\Gamma_{sA} = \frac{P_A^{1-\delta}}{\beta\mu^\delta}$$

and $$\Gamma_{sB} = \frac{P_B^{1-\delta}}{\beta\mu^\delta},$$

where β represents the coefficient of SI suppression by separation of the transmitter and the receiver within the same transceiver unit, and μ and δ represent SI suppression parameters for deployed passive SI cancellation techniques. $P_A$ and $P_B$ are the transmitted signal power at nodes A and B, respectively.

SINR characterizes the quality of a communication system as well as being the performance parameter for a transceiver. Considering an FSO link established using transceivers A and B, each with a single transmitter having a divergence angle of θ and a single receiver having a detection area of $A_{det}$, SINR can be written for node A as:

$$SINR_A = \left[\frac{P_B L_z(d,\lambda) A_{det} \cos(\phi \pm \delta)}{(\tan\theta)^2 4d^2 (N_T + \Gamma_{SA})}\right]^2 \quad (15)$$

where $P_B$ is the transmit power at node B, d is the link distance, and $L_z(d,\lambda)$ is the free-space loss parameter for a link distance of d. The expressions of $L_z$, $N_T$ and $\Gamma_{SA}$ are shown below. φ is the pointing error angle when the transceivers are perfectly aligned, and δ is the 'vibration angle' which is the additional pointing error due to vibration of the mobile transceivers.

For a multi-element FSO transceiver with N transmitters having θ divergence angle each and m receivers with detection area of $A_{det}$, SINR for node A can be expressed as:

$$SINR_A = \sum_{k=1}^{N} \sum_{j:j\in\mathcal{F}_i} \left[\frac{P_{B,i} L_z(d,\lambda) A_{det} \cos(\phi_j \pm \delta_j)}{(\tan\theta)^2 4d^2 (N_T + \Gamma_{SA})}\right]^2 \quad (16)$$

where i and j denote the index of the transmitter and receiver, respectively. $P_{B,i}$ denotes the transmit power at transmitter i at node B. Each transmit beam projects a beam footprint on the transceiver plane and only covers a subset of the available receivers in a transceiver. $\mathcal{F}_i$ represents the set of receivers that falls within the beam footprint of transmitter i. $\phi_j$ and $\delta_j$ are the pointing error and the vibration angles on the beam arriving at receiver $j \in \mathcal{F}_i$.

To maximize SINR, one needs to find the optimum number of transmitters N and receivers m, as well as the positions $p_i(x_i, y_i)$, of the transmitters on the transceiver plane. By choosing the best transmitter positions, one can find the best filing patterns for the transceivers. For the sake of uniformity, identical tiling at both transceivers nodes A and B are considered, assuming the same divergence angle θ for all the transmitters and the same transmit power $P_B$ for all the transmitters.

So, the optimization problem becomes:

$$\max_{N, p_i} SINR_A \quad (17)$$

$$\text{s.t.} \quad N > N_m,$$

$$A_T = NA_{trans} + mA_{det}$$

where $A_{trans}$ is the area of each transmitter occupied in the transceiver plane and $N_m$ is the maximum number of transmitters that can be placed on the transceiver place. The number of receivers m is not included as a parameter of the optimization since it is assumed that for all the positions where a transmitter is not placed, a receiver is placed, i.e., $N_m=N+m$.

Each transmitter i projects a Gaussian beam footprint on the receiver plane centered at the corresponding location of transmitter i with a diameter of d tan θ. $\mathcal{F}_i$ consists of $m_i'$ receivers that falls within the beam footprint. So, the SINR of the IBFD FSO link at node B under no vibration can be written as:

$$SINR_A = \sum_{i=1}^{N} \Pi_i \quad (18)$$

where $$\Pi_i = \sum_{j:j\in\mathcal{F}_i}\left[\frac{P_{B,i}L_z(d,\lambda)A_{det}\cos(\phi_j)}{(\tan\theta)^2 4d^2(N_T+\Gamma_{SA})}\right]^2 \quad (19)$$

One can find the optimum transmitter count, N*, maximizing $SINR_A$ by calculating $$\frac{\partial}{\partial N}(SINR_A)=0.$$

Using Eq. 18, one gets:

$$\frac{\partial}{\partial N}(SINR_A) = \frac{\partial}{\partial N}\sum_{i=1}^{N}\Pi_i = \frac{\partial}{\partial N}(\Pi_1+\Pi_2+\ldots+\Pi_N) \quad (20)$$

Each term of $\Pi_i$ on the right-hand side of Eq. 20 largely depends on the relative location of the transmitter i, as that determines how many receivers ($m_i'$) are covered by the beam footprint. An increase in the number of transmitters also means a reduction in the number of receivers, essentially resulting in reduced receiver area to capture the beam signal. So, the ratio of the total receiver area to the total transceiver area is another parameter that can be used to optimize SINR. In order to attain an analytical solution to N*, the case when this ratio is fixed, i.e., $m_i'$ is constant regardless of i, is considered. This case happens when the link distance (d) is long and/or the divergence angle (θ) of the transmitters is large. In particular, this case would happen when the radius of the beam footprint is greater than or equal to the diagonal of the transceiver plane. Assuming that both transmitter and receivers are square-shaped and are the same size, (i.e., the receiver and the transmitter areas are both equal to $A_{det}$), this case would happen when d tan θ≥ $\sqrt{2N_m A_{det}}$. Then, $\mathcal{F}_i$ consists of all the available receivers on the transceiver, which yields $m_i'=N_m-N$, and Eq. 19 becomes:

$$\Pi_i = \sum_{j=1}^{N_m-N} X_i\left(1-\frac{\phi_j^2}{2}\right)^2 \quad (21)$$

where $$X_i = \left[\frac{P_{B,i}L_z(d,\lambda)A_{det}}{(\tan\theta)^2 4d^2(N_T+\Gamma_{SA})}\right]^2$$

and cos ($\phi_j$) is approximated with the first two terms of Taylor expansion. Now, each receiver has a pointing error angle with respect to each transmitter. If the transmitters and receivers are uniformly distributed, the pointing error angle can be approximated by $\phi_j=j\phi$, where $\phi$ is the minimum pointing error angle. Then, Eq. 21 can be written as:

$$\Pi_i = X_i\left[N_m-N-\phi^2\frac{(N_m-N)(N_m-N+1)(2N_m-2N+1)}{6}\right] \quad (22)$$

Since it is assumed that every transmitter's beam footprint is covered the whole transceiver area, each $\Pi_i$ becomes identical. By using the expression from Eq. 22, Eq. 18 can be written as:

$$SINR_A = XN\bigg[(N_m-N)-\frac{\phi^2}{3}N_m^3+\phi^2 N_m^2 N - \quad (23)$$
$$\phi^2 N_m N^2 + \frac{\phi^2}{3}N^3 - \frac{\phi^2}{2}N_m^2 + \phi^2 N_m N - \frac{\phi^2}{2}N^2 - \frac{\phi^2}{6}N_m - \frac{\phi^2}{6}N\bigg]$$

By differentiating the term from Eq. 23, one gets:

$$\frac{\partial}{\partial N}(SINR_A) = X\bigg[(N_m-4N)+2\phi^2 N_m^2 N - 3\phi^2 N_m N^2 + \quad (24)$$
$$\frac{4}{3}\phi^2 N^3 + 2\phi^2 N_m N - 3\frac{\phi^2}{2}N^2 - \frac{\phi^2}{3}N - \frac{\phi^2}{3}N_m^3 - \frac{\phi^2}{2}N_m^2 - \frac{\phi^2}{6}N_m\bigg]$$

By simplifying the equating and setting $$\frac{\partial}{\partial N}(SINR_A)=0,$$

one gets:

$$aN^3+bN^2+cN+d=0 \quad (25)$$

where,
$a=4/3\phi^2$ $$b=\frac{\phi^2}{2}-3\phi^2 N_m$$

$$c=2\phi^2 N_m^2 + 2\phi^2 N_m - 4 - \frac{\phi^2}{3}$$

$$d=N_m-\frac{\phi^2}{6}N_m-\frac{\phi^2}{2}N_m^2-\frac{\phi^2}{3}N_m^3$$

Now, the value of $N_m$ can range from few tens to few hundreds and $\phi$ is in the order of mrad, for practical cases. In that case, the coefficients approximated as a≈0, b≈0, c≈−4, and d≈$N_m$. The optimum number of transmitters reduces to $$\frac{N}{N_m} \approx 0.25.$$

This solution represents the case when pointing error angles are negligible. However, for practical cases, due to finite pointing error angles, the optimum solution for N* is smaller than 0.25 $N_m$.

As described in detail below, a numerical solution of the optimization problem is implemented by using randomly generated sets. First, the optimum number of transmitters (N) is calculated and then the optimum positions ($p_i$) of the transmitters on the transceiver plane are determined. A genetic evolution algorithm technique is also implemented and described to find the optimum positions for the transmitters on the transceiver plane.

To determine the optimum tiling positions of the transceiver elements, a MATLAB tool was developed to simulate the communication link and calculate SINR for each node. For this simulation, 50 m long FSO channels were assumed between two UAVs communicating in IBFD node using wavelength $\lambda$=900 nm. The transceiver size is set to 10 cm×10 cm. It is assumed that direct LOS is already established, however, the vibrational effects from the UAVs is still present which can lead to pointing error of the link.

Figure 5:
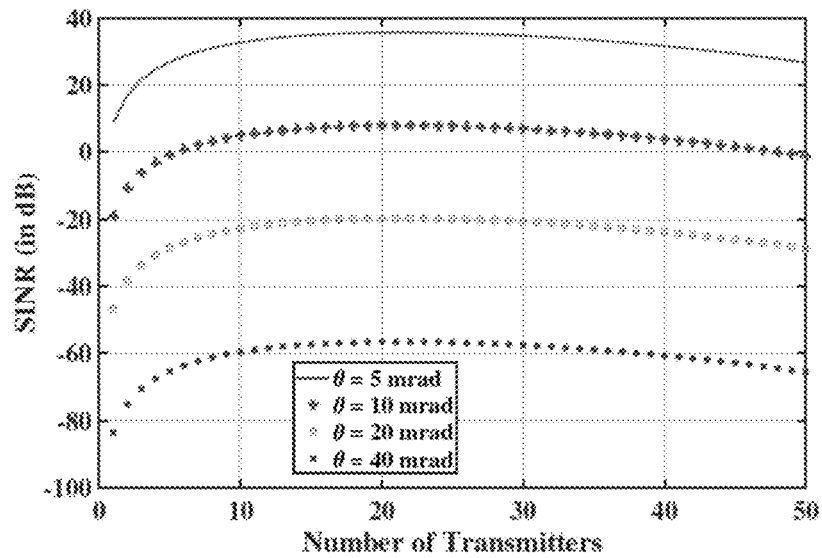
FIG. 5 is a graphical illustration of the SINR calculation for different divergence angles of the transmitters, while d=100 m, $\phi$=3.4 mrad, and $P_T$=10 mW.

As the position of the transmitter is varied on the transceiver plane, a pointing error with the other node takes place. This pointing error is calculated in terms of pointing angle, $\phi$, vibration of the mobile platform incorporates additional error, which is also calculated in terms of angular error (+$\delta$). These pointing angle errors 305 are shown in FIG. 3. FIG. 4A and FIG. 5B shows two categories of possible tiling schemes. In the scheme shown in FIG. 4A, all the transmitters are positioned equidistant from the center of the transceiver plane. In the scheme shown in FIG. 4B, all the transmitters are positioned randomly. In the randomly positioned case, N transmitter slots were randomly selected, and the remainder are considered to be receiver area. Free-space path loss is calculated for determining SINR for the channel, which is shown in FIG. 2.

To determine the number of transmitters required to obtain the best performance, the FSO link was simulated by varying the transmitter count from 1 to 99, out of possible 100 positions, and SINR was calculated for different divergence angles ($\phi$). It can observed from FIG. 5 that best performance of the link occurs when the number of transmitters (N) is equal to 22, irrespective of divergence angles. With the increase of the transmitter count, receiver area reduces and that results in degraded link performance. Also, by increasing the divergence angle, most of the power collected at the receiver end is also reduced, with a corresponding reduction of SINR.

Figure 6:
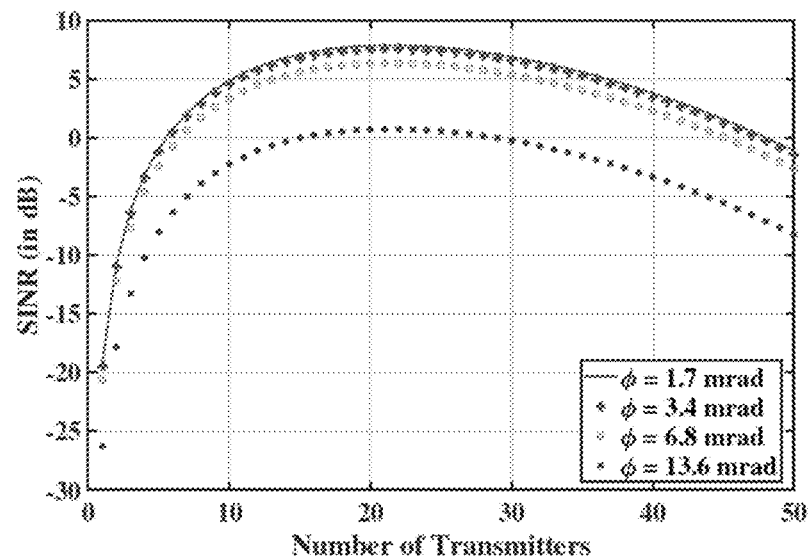
FIG. 6 is a graphical illustration of the SINR calculation for different positioning of the transmitters in the transceiver plane, while d=100 m, $\theta$=10 mrad, and $P_T$=10 mW.
Figure 7:
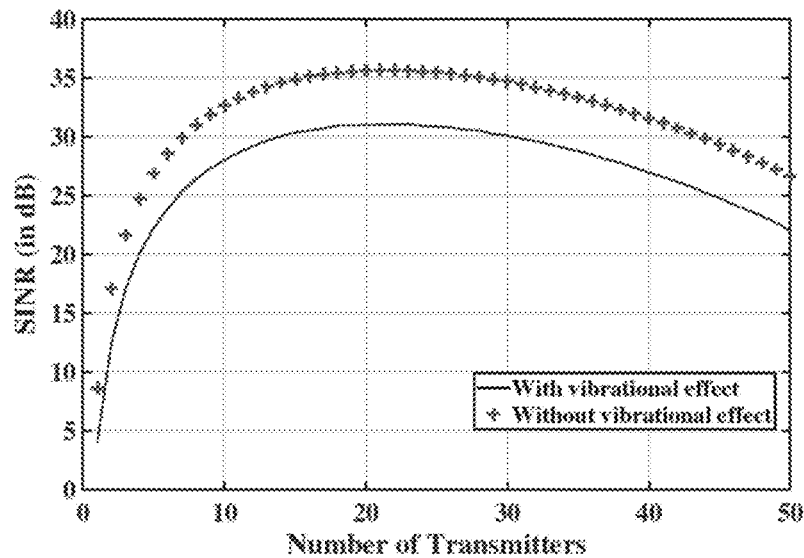
FIG. 7 is a graphical illustration of the effect on SINR at the presence of vibration of the mobile platform for d=100 m, $\phi$=1.7 mrad, 0=5 mrad and $P_T$=10 mW.
Figure 8:
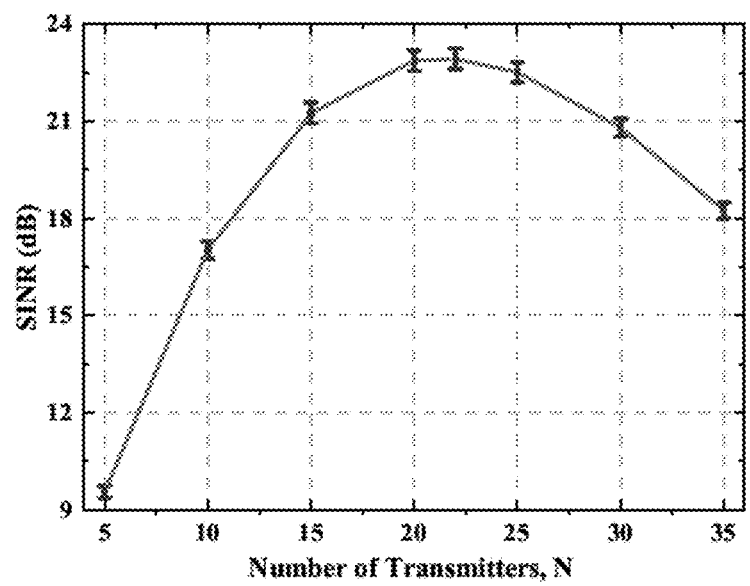
FIG. 8 is a graphical illustration of the variation of SINR when the transmitters with $\theta$=5 mrad divergence angle are placed randomly on a 10×10 transceiver grid, while=50 m and $P_T$=10 MW.
Figure 9A:
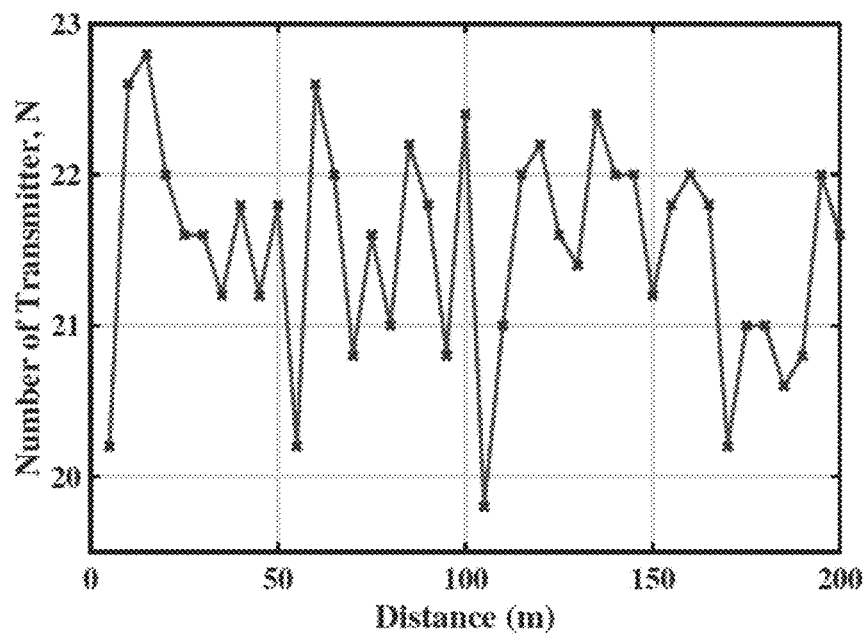
FIG. 9A is a graphical illustration of the optimum number of transmitters (N) for different link ranges (d).
Figure 9B:
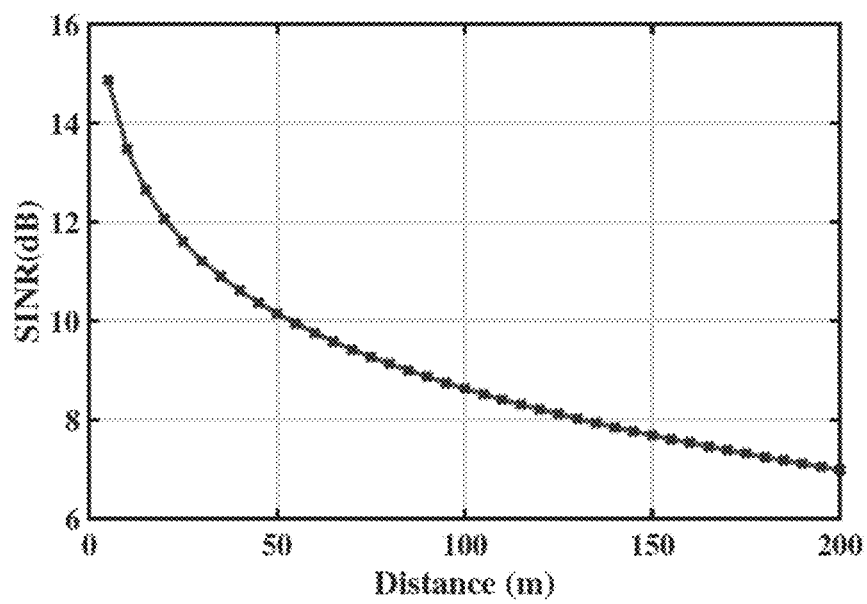
FIG. 9B is a graphical illustration of the SINR variation for different link ranges (d).

Further investigations were performed by varying the position of the transmitters on the transceiver plane and hence changing the pointing error angle ($\phi$) by using the equidistance scheme from FIG. 4A. FIG. 6 illustrates the results for different $\phi$ values and calculated by varying N. It can again be observed that the best-case performance can be achieved for N=22. FIG. 7 shows the effect of vibration on the link performance of the FSO channel. FIG. 8 shows the average and standard deviation of the calculated SINR for different values. Vibrations were also randomly generated, and the simulations were repeated for 1000 times to incorporate the effects of vibration into the simulation. Even though the overall SINR obtained is reduced by introducing vibration, the best-case scenario still occurs at N=22, or it can be said that a 22% area of the transceiver plane needs to be covered with transmitters. Even when the link distance is varied over a large range, the optimum number of transmitters remains close to 22%, as shown in FIG. 9A, whereas the average SINR drops exponentially with distance, as shown in FIG. 9B. By using the simulation parameters and solved the equation derived in Eq. 25, N=25 results. The analytical solution was an approximation of the real-world scenario, however a fairly close solution is achieved.

Figure 10:
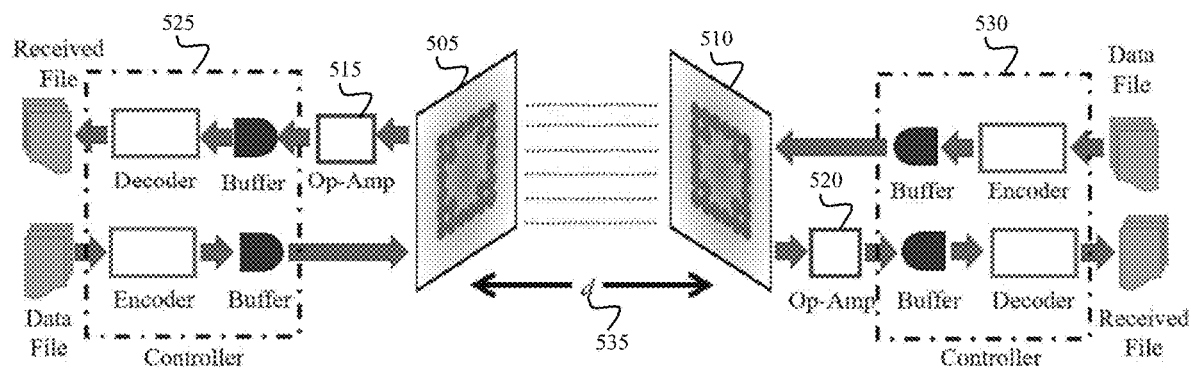
FIG. 10 is an illustration of a system architecture for 2 node FSOC communication system with the transmitters of each node forming an interior box of 20 transmitters and the extra 4 transmitter elements positioned within one of the four corners of the interior box.

While the number of transmitters for a 10×10 array design is determined to be equal to 22 for the best performance, in order to attain the required routing path for steady and balanced current for the 22 transmitters, the necessary voltage source is too large to incorporate the overall system. The weight, capacity and cost of the voltage source outweighs the performance improvement achieved. Instead, by using 24 transmitters there is the ability to distribute the transmitters along multiple routes and balance the current supplied to each transmitter. This design is illustrated in FIG. 10, wherein the overall system architecture includes two 10×10 arrays 505, 510 separated by a distance d 535 with 24 transmit sources forming an internal box with extra elements on the four corners of the box and the 74 receiver elements are the rest of the elements on the array. These transmit and receive circuits were routed and simulated separately in the EDA software for simplification.

The arrays 505, 510 are coupled through a respective op-amp 515, 520 to a respective controller 525, 530. Each of the controllers 525, 530 may include encoders, decoders and buffers to establish a two-stage trans-impedance amplifier that is used to convert the receive photocurrent signal into a voltage level that is then stored in the memory buffer of the controller, as is commonly known in the art for optoelectronic receivers. An internal clock of the controllers 525, 530 is used to sample the voltage level of each bit and convert the signal using Analog to Digital Converter (ADC) to reconstruct each bit.

Figure 11A:
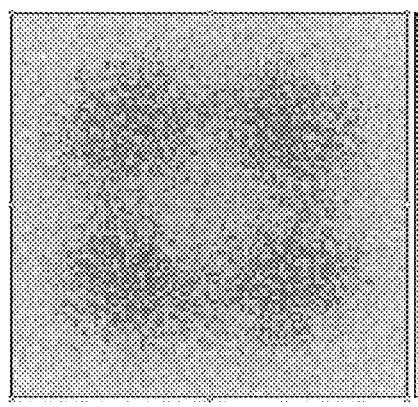
FIG. 11A illustrates a heatmap of transmitter locations on a 100×100 transceiver grid for best performances out of randomly generated set.
Figure 11B:
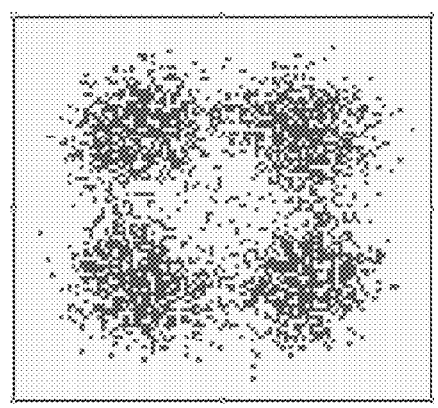
FIG. 11B illustrates transmitter locations based on the heatmap generated from the best performing sets shown in FIG. 11A.

In an additional embodiment, all of the findings were gathered from the simulations of the equidistant scheme of FIG. 4A into the random position scheme, as shown in FIG. 4B. The grid size of the transceiver plane was increased to 100×100 array. 100,000 set of transceiver planes were generated with randomly positioned transmitters for each N, in this case, to cover 22% of the area of the plane, N=2,200. To determine the optimum positions of the transmitters for N=2,200, 1,000 best sets were selected out of randomly generated 100,000 sets based upon SINR performance. The process was repeated 3 times with seed values. Finally, a heatmap of the transceiver plane was constructed by overlapping the best tiling sets (i.e., more shading indicates more transmitters were placed at that position in these filing sets), as shown in FIG. 11A, assuming the presence of vibrational effects. One can observe from FIG. 11B that the best performance can be achieved when the majority of the transmitters are positioned around the center of the transceiver plane, with the receiving areas at the center of the transceiver plane. The reason for the disperse positioning due to the presence of vibrational effects of the mounting platform is the Gaussian beam profile of the transmit signal and the beam centers carry most of the energy. If the transmitters are positioned around the edges, the center of the beams might all outside of the transceiver plane and most of the energy goes undetected in the presence of vibration. To accommodate for such cases, the optimum transmitter positions are clustered in four separate areas located approximately midway from the center to the corners of the transceiver plane so that at least the center of the beams from those 'edge transmitters' could fall on the receiving plane.

It is notable that the center of the transceiver plane does not include only few receivers instead of being entirely covered with transmitters. The intuition behind this is that the center of the optical beam carries most of the energy. If the center of the plane is covered entirely by transmitters, the center of the beams coming from the other transmitter plane would not be received and only the outer part of those beams would be received, resulting in a small aggregate received intensity. With the presence of vibration, however, the best transmitter positions are more dispersed to increase the likelihood of receiving the center of the beams coming from the other side.

This random set-based technique of obtaining the optimum solution is computationally heavy, hence a more efficient may be required. To overcome the computational complexity, a heuristic optimization method was devised based on genetic algorithms.

In order to tackle the computational complexity of the randomized set selection and to find solutions closer to the optimum, a genetic algorithm approach to the problem of tiling positions of the transmitters on the transceiver plane was developed. As the transceiver plane is divided into 100×100 grid, it provides 10,000 different positions to consider for the locations of the transmitters. Essentially, the size of the search space for the optimization problem becomes $2^{10000}-1$. Using the randomly generated sets to determine the optimum tiling will require huge computational time. Even in the optimization approach presented above, it was only possible to explore a fraction of every possible tiling combination. The proposed genetic algorithm provides a faster way to approach the optimum number of transmitters, while also requiring smaller computational capacity.

To implement the genetic algorithm, a fewer number of randomly generated sets of the transceiver plane are utilized. To reduce the complexity of the problem, it is assumed that 22% of the area is covered with transmitters, as was determined in the previous discussion. To start the process, 5,000 different sets were randomly generated and the SINR was calculated for each set. The best 10% sets out of the total population were then identified, based on the SINR calculation, which is referred to as the 'fit population'. The 'fit population' to is then used to generate the next generation by applying crossover technique. Two members from the current fit population are randomly selected to obtain a member of the next generation. The crossover performed done over two steps: (1) The common positions of the two selected parents are identified and the common positions in the child are retained; (2) The rest of the transmitter positions are selected from each parent in 1:1 ratio. The process is repeated to obtain the entire population for the next generation and to calculate SINR for each set. The process is repeated until no significant improvement is identifiable in the average SINR value of the fit population for three (3) consecutive generations or a certain number of generations are obtained. A pseudo-code of the algorithm is presented in Algorithm 1.

Algorithm 1 Genetic Algorithm for Optimized Tiling

```
1:   Initialize Transmitter count, N
2:   Initialize Transceiver plane
3:   Initialize Population Set count, P
4:   Set ∈ as SINR tolerance
5:   flag=TRUE
6:   Generate Population Set by random selection for Generation 1
7:   Calculate SINR for each set
8:   while flag is TRUE do
9:       Identify Best f% as fit population seed for Generation i + 1
10:      Generate Population Set by crossover( ) for Generation i + 1
11:      Calculate SINR for each set
12:      Compare SINR with Generation i
13:      if SINR(i+1)-SINR(i)< ∈ for 3 consecutive generations then
14:          flag=FALSE
15:      else
16:          repeat next generation
17:      end if
18:  end while
crossover( )
1:   Choose two (2) parents randomly from the fit population
2:   Determine common transmitter positions for the parents
3:   Keep common transmitter positions for the child
4:   Choose rest of the transmitter positions from both parents randomly at 1:1 ratio
```

Figure 12:
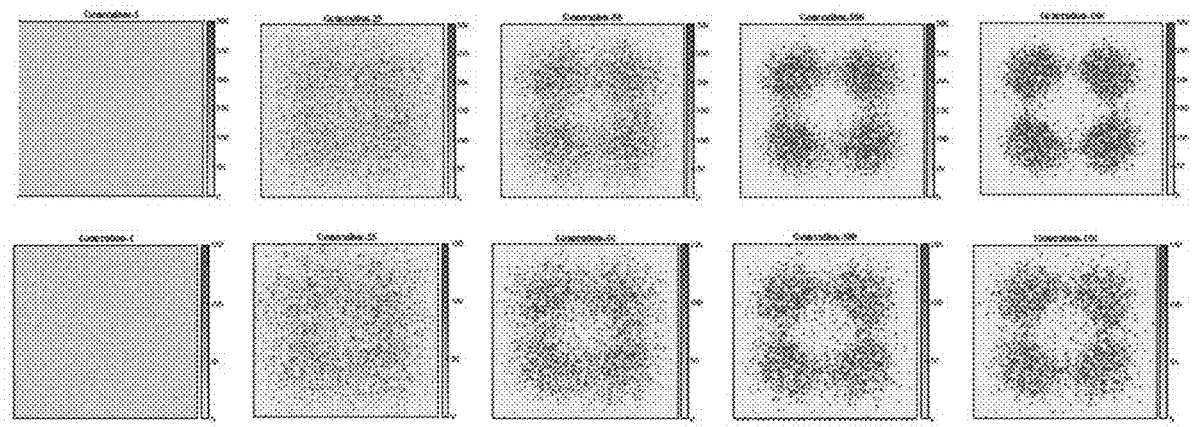
FIG. 12 illustrates heatmaps of transmitter locations on a 100×100 transceiver grid for best performances for different generations of genetic evolution, wherein the top row is 20% fit population and the bottom for is 10% fit population.
Figures 13A, 13B:
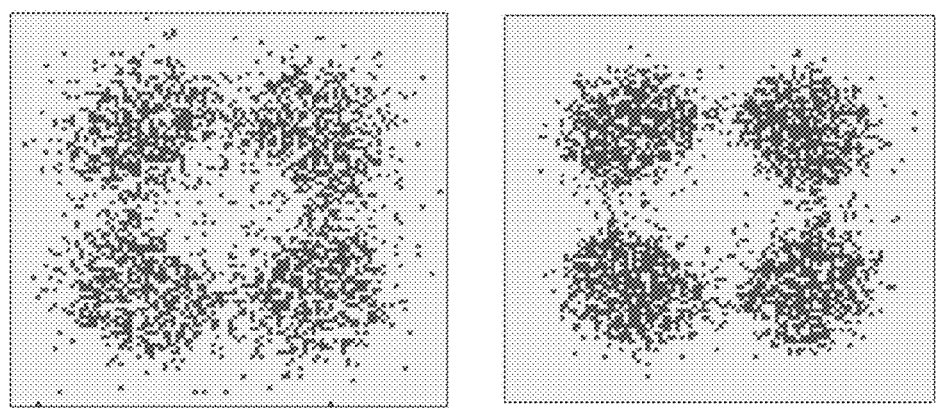
FIG. 13A illustrates optimized transmitter locations of a 100×100 transceiver grid using genetic evolution after generation 150 with 10% fit population with vibrational effect.
FIG. 13B illustrates optimized transmitter locations of a 100×100 transceiver grid using genetic evolution after generation 150 with 20% fit population with vibrational effect.

The evolution of the optimized tiling solutions over different generations is presented in FIG. 12. As shown, the heatmaps are generated by overlapping the transmitter tiling positions of the members of the fit populations of each generation. One can observe from FIG. 12 that the transmitters positioned around the center, with the receiving area at the center, provides the best performance, as was also observed with the randomly generated sets as previously described. Hence, the convergence over the generations is observed as the transmitter locations are more clustered in four lobes located midway towards the corners of the transceiver plane from the center. Additionally, when changing the fit population size to 10%, a similar convergence pattern was observed. After about 50 generations, both 20% and 10% fit population case indicates most of the transmitters should be positioned around the center of the transceiver plane, as was also observed with the randomly generated sets. As vibrations effect tends to introduce higher combined pointing error angle, transmitters being around the center makes it more convenient for the receiving end to capture most of the energy, even in the presence of vibrations using this tiling pattern. FIG. 13A illustrates optimized transmitter locations of a 100×100 transceiver grid using genetic evolution after generation 150 with 10% fit population with vibrational effect. FIG. 13B illustrates optimized transmitter locations of a 100×100 transceiver grid using genetic evolution after generation 150 with 20% fit population with vibrational effect. Both of these tiling solutions indicate optimum transmitter positions to obtain best SINR performance under vibrational effects. Comparing the solutions of the genetic algorithm with the solution from randomly generated cases, it can be established that the optimized tiling solution can be obtained using the genetic algorithm, which requires much smaller computational capability.

To understand the effect of the genetic algorithm parameters on the results, the fit population size was varied and SINR was observed over generations. To determine how many generations are required to achieve the SINR saturation, the fit population size was varied for different values from 20% to 1%. For each case, the total population size was fixed at 5,000 and the number of transmitters was fixed at 2,200.

Figure 14:
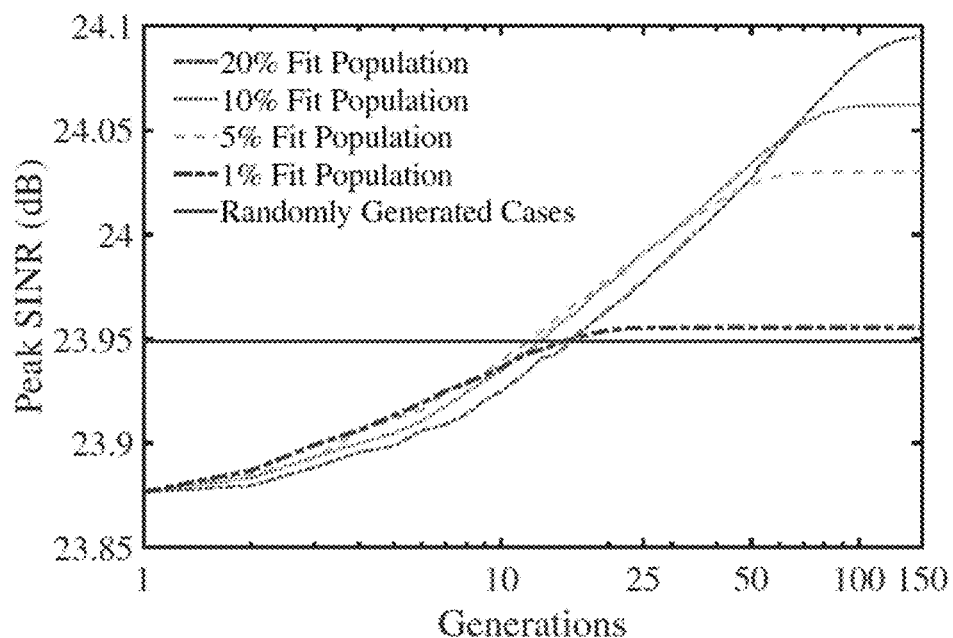
FIG. 14 is a graphical illustration of peak SINR of the fit population over 150 generations of evolution.

FIG. 14 illustrates the variation of the peak SINR of the fit populations over generations. As shown in FIG. 14, a smaller fit population yields better solutions in early generations, but converges to a more sub-optimal solution, eventually. However, best SINR performance can be achieved when the fit population is increased. Essentially, this requires generating more generations and more computations time. The results from the genetic algorithm simulations are summarized in Table 1.

TABLE 1

Summary of Genetic Algorithm Simulations

| Fit Population size | # of Generations to Converge | Peak SINR (dB) |
|---|---|---|
| 20% | 190 | 24.09 |
| 10% | 145 | 24.06 |
| 5% | 100 | 24.03 |
| 1% | 80 | 23.96 |

FIG. 14 illustrates peak SINR of the fit population over 150 generations of evolution for the fit population sizes shown in Table 1 and in for the randomly generates sets. It can clearly be observed that the genetic algorithm approach consistently outperforms the randomized set selection after approximately 20 generations.

In addition to determining the optimum and location of the transmitters on the transceiver plane, a near-afocal lens assembly for the transmitters can provide tolerance to vibration and sway to ensure LOS. In various embodiments, the present invention provides a defocal lens assembly for the transmitters to control the beam width and footprint at the receiver end to optimize the received power and tolerance to vibration, sway and tilt of the mobile platform.

FSOC systems can be categorized based upon optical link range and location of deployment. Short-range systems can be very useful for indoor applications and utilize the wider divergence angle of LEDs to establish optical links. However, outdoor settings require narrower beam transmitters and susceptibility to atmospheric turbulence and instability of the mobile platform. The focus of the various embodiments of the present invention is on short to medium range FSO links with limitations on size, weight and power (SWaP) to achieve low-altitude laser links for massive network deployment.

Figure 15:
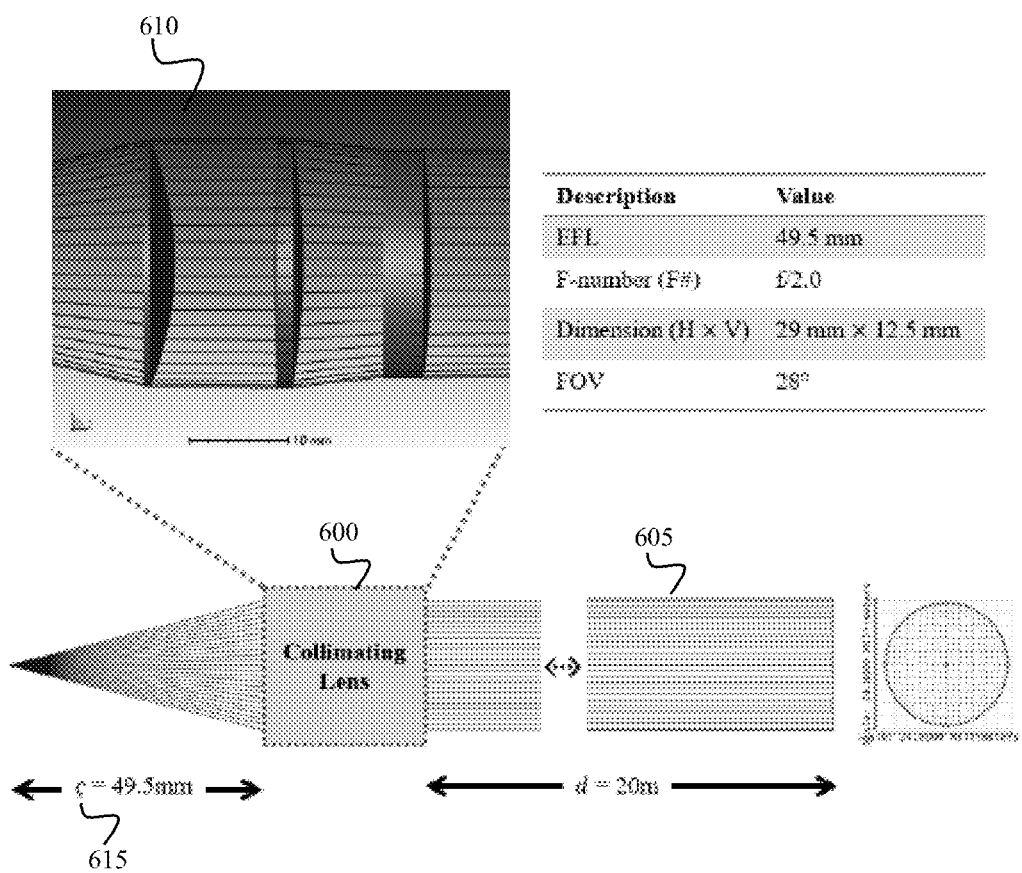
FIG. 15 is a diagram illustrating a fixed effective focal length lens for a free-space optical system.

When parallel (or collimated) light rays from an infinitely distant source fall on a lens system, there are three possible outcomes: First, the parallel rays converge to a real-point outside the lens system; second, the light rays appear to diverge from a point within the lens system; and third, the light rays emerge as parallel (or collimated) rays after the lens system with slightly different characteristics compared to the incident rays. In the first two cases, the lens system has a finite focal length and field-of-view (FOV). These systems are referred to as focal systems. On the other hand, the system in the third case does not have finite focal length, or one can say that the light rays converge or diverge at an infinite length. This system is referred to as an afocal lens system. The direction of the ray path is reversible. Hence, for the first scenario, if a diverging point source is placed at a focal length of a lens system 600, the output light rays 605 appear to be parallel (or collimated), as shown in FIG. 15. The present invention utilizes these characteristics to design a lens assembly for the transmitters for medium range FSOC.

To improve the performance of the overall optical system, one of the major parameters that requires improvement is optical coupling efficiency ($\eta_{OC}$). Generally, coupling efficiency indicates how much transmitted power can be coupled into the receiver. The expression for $\eta_{OC}$ can be given as:

$$\eta_{OC} = \eta_T \eta_{ch} \eta_R \quad (26)$$

where $\eta_T$ is the transmitter outcoupling efficiency, $\eta_{ch}$ is the channel coupling efficiency that includes atmospheric attenuation losses and perturbations, and $\eta_R$ is the receiver efficiency that includes power collected by the receiver area and coupling optical power into electrical circuits. Losses incurred during the beam propagation through free-space are accounted for in the coupling term $\eta_{ch}$. Atmospheric absorptions, scattering, and turbulence are the major factors that deteriorate beam quality and directionality. However, these effects are minimum when clear weather, higher visibility and small temperature gradients are considered. These effects may become prominent for long-range FSOC.

In paraxial analysis, the transmitter is placed at the focal point of the lens system on the optical axis. If the emission distribution is described by $J_T(\beta)$, where $J_T$ is normalized to emission into $2\pi$ steradians of a hemisphere and $\beta$ is the angle from zenith, the transmitter than can be approximated by:

$$\eta_T = \int_0^{\beta_{max}} \int_0^{2\pi} J_T(\beta) d\beta d\phi \quad (27)$$

where $\beta_{max} = \tan^{-1}(1/2 \, F_T)$ is the angle of the marginal rays to the edge of the lens and $F_T$ is the F-number of the lens. The coupling efficiency of the receiver ($\eta_R$) can be described as the ratio of the power collected by the receiver to the power that arrives at the receiver plane. If the intensity distribution of the beam at the receiver plane is defined as $J_R$ (d), $\eta_R$ can be given by:

$$\eta_R = \frac{\iint J_R(d) \otimes A_R}{\iint J_R(d) \otimes A_{BF}} \quad (28)$$

where d is the optical link distance, $A_R$ is the effective receiver area, and $A_{BF}$ is the beam footprint at the transceiver plane. This coupling efficiency cannot be represented by the ration of the receiver area and beam footprint, as the intensity of a Gaussian beam varies within the beam cross section.

Figure 16A:
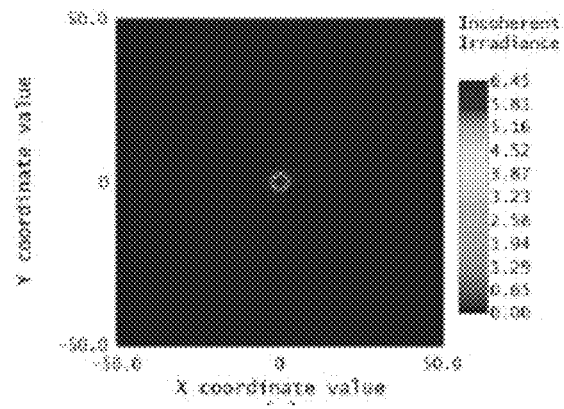
FIG. 16A illustrates an optical beam footprint for a single transmitter collimated beam ($\Delta\zeta$=0 mm).
Figure 16B:
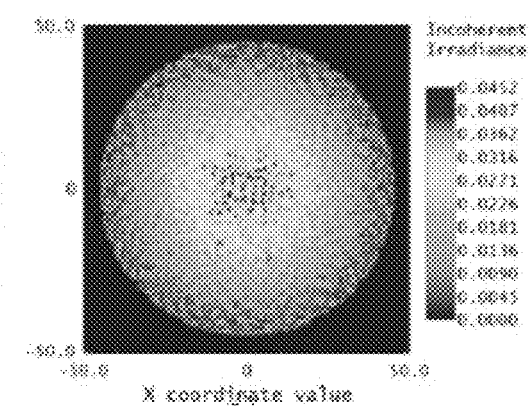
FIG. 16B illustrates an optical beam footprint for a single transmitter defocused beam ($\Delta\zeta$=0.8 mm).
Figure 16C:
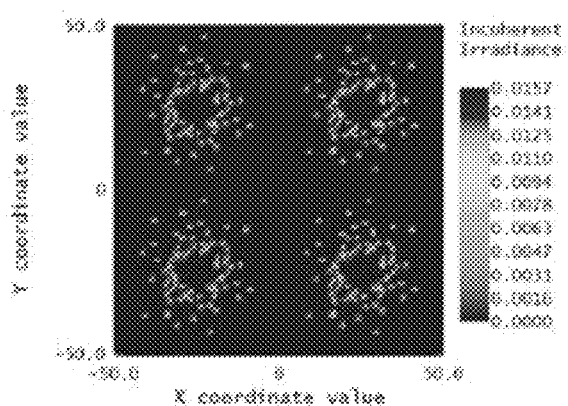
FIG. 16C illustrates an optical beam footprint for four transmitters collimated beam ($\Delta\zeta$=0 mm).
Figure 16D:
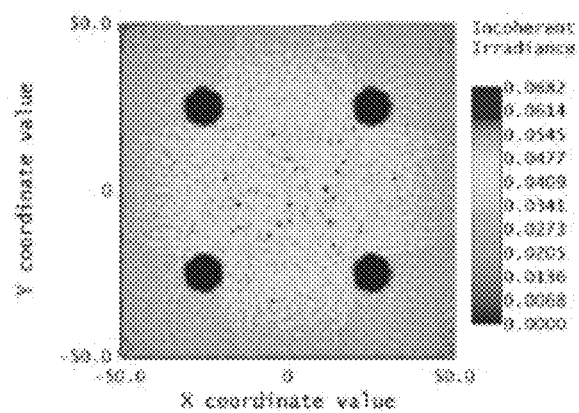
FIG. 16D illustrates an optical beam footprint for four transmitters defocused beam ($\Delta\zeta$=0.8 mm).

To observe the relation between the optical link distance coupling efficiency, defocused beam footprint, and vibration tolerance, a lens assembly in Zemax OpticStudio with paraxial approximation was developed. The lens assembly 610 was designed in a fashion so that the light rays coming out of the lens are collimated and hence can be useful for longer optical range. The lens prescription was optimized using sequential mode in Zemax. The spot size of the beam on the receiver plane is 11 mm and most of the power is contained within the beam width, as shown in FIG. 16A. But, if one considers the transceiver design, this beam will fall only on the transmitter on the other side and none of the power arriving at the receiver plane will be converted into signal. Hence, the beam is deliberately defocused by changing the distance ($\zeta$) 615 between the transmitter and the lens assembly. A very small offset of $\Delta\zeta=0.8$ mm can lead to a much bigger beam footprint at the receiver, as shown in FIG. 16B. Assuming there are four clusters of transmitters on the transceiver, as previous discussed, the transceiver plane power coupling is simulated using non-sequential environment in Zemax. For both collimated, as shown in FIG. 15C, and defocused, as shown in FIG. 15D, the beam footprint shows how much power would be coupled into the receiver.

Accordingly, a defocused lens system is provided for the multi-element transmitter of a laser-based IBFD FSOC link. In various embodiments, a fixed focal length lens system with adjustable distance ($\zeta$) between the transmitter and lens assembly is provided. The adjustable distance ($\zeta$) can be effective and advantageous for three reasons: First, the controller can optimize the beam footprint radius by implementing a feedback algorithm so that it can cover the maximum receiving area and couple the maximum power to the receiving end. Second, with the variation of optical link range, the defocusing distance ($\Delta\zeta$) is different. The adjustability of the $\Delta\zeta$ give an optimum operating condition over a wide window of optical range. Third, mobile platforms tend to experience loss of communication due to vibration, sway and tilt. Use of lasers as transmitters, instead of LEDs, makes it even harder to maintain the optical link. By using adjustable $\Delta\zeta$ robustness and tolerance to vibration and sway can be provided. However, this robustness to vibrations comes with a trade-off. Tolerance can be increased by increased defocus and larger beam footprint, which leads to distributed intensity and lower coupling efficiency. One can define a term ($\xi$) to measure the trade-off between beam footprint radius (R) and coupling efficiency ($\eta_{OC}$), where $\xi = R \times \eta_{OC}$. Larger beam footprint radius gives much better vibration tolerance of the system, but at the same time, the received power is compromised. The intensity of light has a Gaussian distribution across the beam footprint. As the receiver is constant, by increasing R effectively reduces $\eta_{OC}$. By maximizing $\xi$ values, we can ensure optimum operating condition of FSOC.

To optimize the lens assembly shown in FIG. 15, the beam footprint radius R of the beam spot on the transceiver plane is first determined. As can be seen from FIG. 17, the radius 700 increases with the defocusing distance ($\Delta\zeta$) for a link distance of d=20 m and corresponding ray trace diagram is also shown in FIG. 15. The corresponding vibration tolerance margin is also calculated and shown in FIG. 18. The tolerance of the system in terms of the defocusing distance corresponds to the beam footprint design. In the beam footprint inset of FIG. 18, the additional length in either the horizontal or vertical direction represents the tolerance length.

Figure 17:
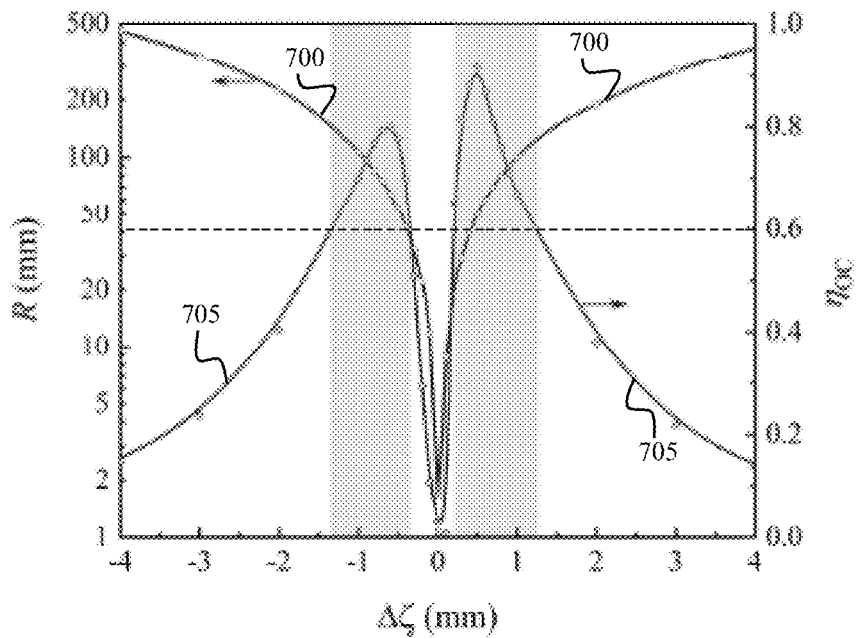
FIG. 17 is a graphical illustration of beam width radius and optical coupling efficiency for optical link range, (d=20 m).
Figure 18:
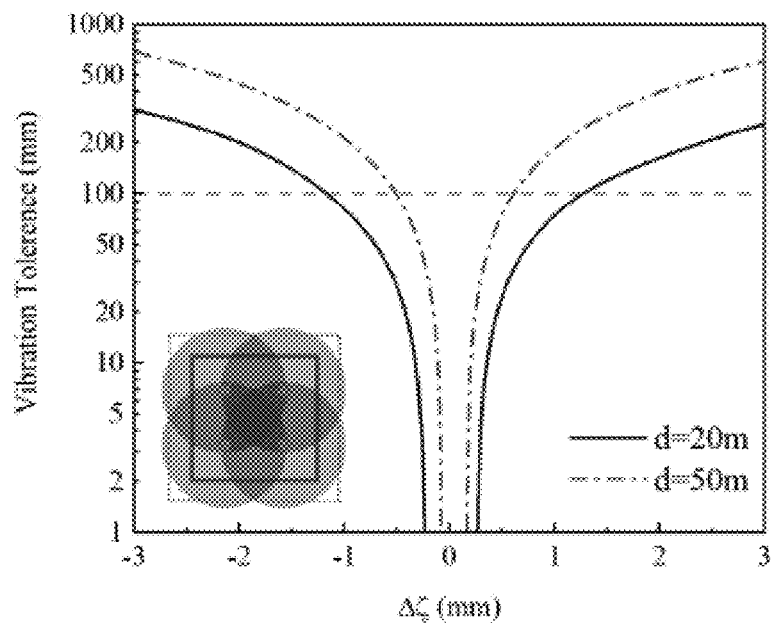
FIG. 18 is a graphical illustration of vibration tolerance for defocused lens system for d=20 m and d=50 m.
Figure 19:
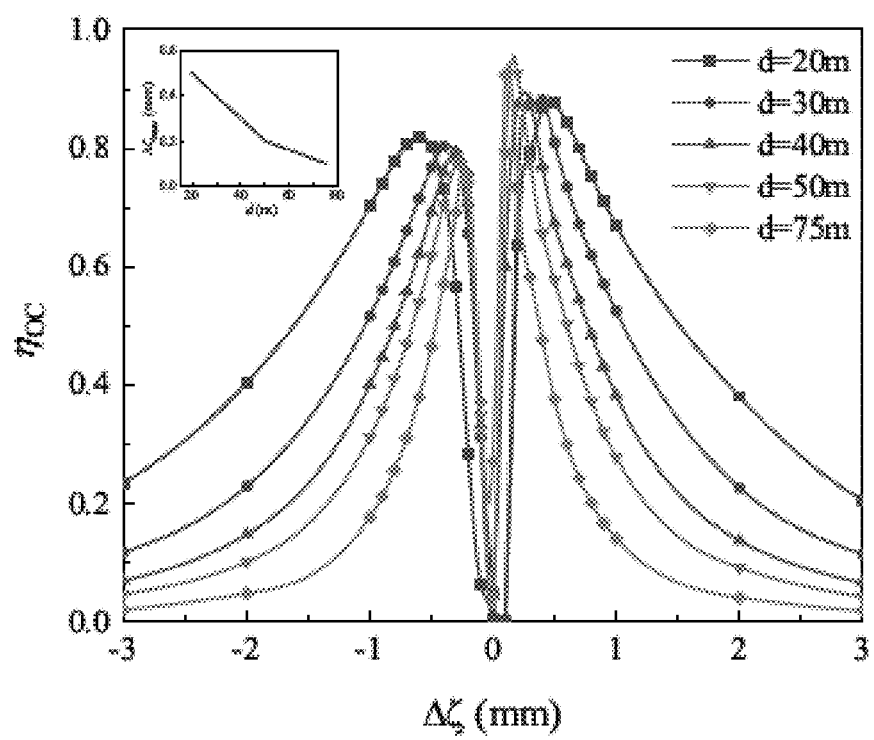
FIG. 19 is a graphical illustration of optical coupling efficiency for different link ranges, wherein the inset illustrates defocused length corresponding to the maximum coupling efficiency for different link ranges.

After the lens system design has been finalized based on the collimation of light rays, the lens design is converted into a non-sequential environment. Based on the simulation results previously presented, four transmitters are positioned on the transceiver plane and the rest of the area is defined as receiver. The distance between two transceiver planes is varied form 20 m to 75 m. The coupling efficiency is calculated based on the received power by the receiver. FIG. 17 shows the coupling efficiency 705 with respect to the defocusing distance ($\Delta\zeta$) When $\Delta\zeta=0$, or the incoming beam to the receiver is collimated, the least amount of power 705 is coupled into the receiver, as most of the power is perfectly aligned with the transmitter on the transceiver plane. But, as the defocusing increases, coupled received power 705 also increases, as long as the beam radius 700 falls within the transceiver plane. When the beam radius 700 at the receiver plane becomes significantly larger than the transceiver area, coupling efficiency decreases. Even though the Gaussian beam concentrates more power at the center of the beam cross-section, as the beam radius increases, power starts to be distributed over larger area and effective coupling decreases. The maximum coupling efficiency ($\eta_{max}$) remains relatively constant over a wide window of optical range (from 20 m to 75 m). However, $\eta_{max}$ occurs at different defocusing distances ($\Delta\zeta_{max}$) for different d values. FIG. 19 shows the coupling efficiency for different d values at different $\Delta\zeta$ positions. It can also be shown that the position of $\Delta\zeta_{max}$ varies over a window of optical link range.

Figure 20:
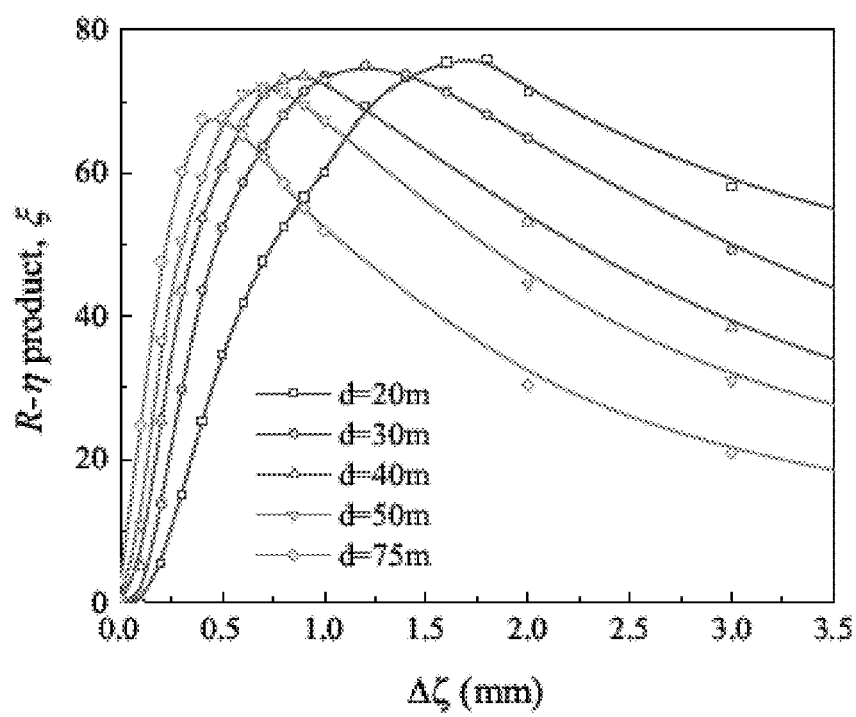
FIG. 20 is a graphical illustration of the variation of trade-off parameter corresponding to the defocused length for different optical link ranges.

Finally, the value of $\xi$ can be calculated to determine the optimum operating defocusing distance, $\Delta\zeta$. FIG. 20 shows the trade-off parameter, $\xi$, with respect to $\Delta\zeta$ for different optical link range, d values. One can determine the optimum value of $\Delta\zeta_{opt}$ from these plots. One can observe that $\Delta\zeta_{opt}$ is smaller for higher d values, as a non-collimated beam has a larger beam footprint for longer link range. As a result, coupling efficiency drops much faster compared to smaller link range, as can be observed from FIG. 19 as well. These simulation results provide a guideline for designing a fixed effective focal length lens system and illustrate how defocusing can be utilized to optimize the coupling efficiency and vibration tolerance for a mobile FSOC.

In various embodiments, a transmitter lens assembly with fixed effective focal length to maximize the optical coupling efficiency and vibration tolerance for a mobile FSOC link by adjusting defocusing length is provided. In particular, a lens system with 49.5 mm EFL, F/2, and FOV of 28% for each of the 4 transmitter clusters is proposed, which give a coupling efficiency of up to 57% and vibration tolerance of 11.5 cm, when the link range is d=50 m.

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An in-band full-duplex (IBFD) free-space optical (FSO) system comprising:
    a first transceiver and a second transceiver, each of the first transceiver and the second transceiver comprising;
        a transceiver plane;
        a plurality of transmitters positioned on the transceiver plane, wherein the plurality of transmitters occupy a portion of the transceiver plane, the plurality of transmitters are substantially equally separated into one of a plurality of transceiver clusters on the transceiver plane, and wherein the plurality of transceiver clusters are approximately equidistant from each other and from a center of the transceiver plane; and
        a plurality of receivers positioned on the transceiver plane, wherein the plurality of receivers occupy the transceiver plane not occupied by the plurality of transmitters and wherein the plurality of receivers are positioned within an interior of the plurality of transceiver clusters;
    wherein the plurality of transmitters and the plurality of receivers of the first transceiver and the plurality of transmitters and the plurality of receivers of the second transceiver perform IBFD communication by simultaneously transmitting and receiving optical signals in a same frequency band.

2. The FSO system of claim 1, wherein the plurality of transmitters of the first transceiver and the second transceiver comprises a first set of transmitters positioned to form a square having four corners and an interior area and a second set of transmitters positioned within the interior area at one of the four corners of the square.

3. The FSO system of claim 2, wherein the plurality of receivers of the first transceiver and the second transceiver are positioned within the interior area of the square.

4. The FSO system of claim 1, wherein the transceiver plane of the first transceiver and the second transceiver is square-shaped.

5. The FSO system of claim 1, wherein the plurality of transmitters of the first transceiver and the second transceiver are laser-based transmitters.

6. The FSO system of claim 1, wherein the plurality of receivers of the first transceiver and the second transceiver are photodiodes.

7. The FSO system of claim 1, wherein the transceiver plane of the first transceiver and the second transceiver comprises a two-dimensional array and wherein the plurality of transmitters occupy a portion of the two-dimensional array.

8. The FSO system of claim 2, wherein the transceiver plane of the first transceiver and the second transceiver comprises a 10×10 array, wherein the first set of transmitters is 20 transmitters to form the square within the 10×10 array and the second set of transmitters is 4 transmitters, wherein 1 transmitter of the second set is positioned within the interior at each of the four corners of the square.

9. The FSO system of claim 1, further comprising a defocal lens assembly positioned to receive a beam from one or more of the plurality of transmitters of the first transceiver and the second transceiver, wherein an optical link distance between the defocal lens assembly and the one or more of the plurality of transmitters of the first transceiver and the second transceiver is adjustable.

10. The FSO system of claim 9, wherein the defocal lens assembly comprises a collimating lens.

11. The FSO system of claim 2, wherein the optical link distance is adjusted to maximize an optical coupling between the plurality of transmitters of the first transceiver and a receiver optically linked to the second transceiver.

12. The FSO system of claim 9, wherein the optical link distance is adjusted to maximize vibration tolerance of an optical link between the plurality of transmitters of the first transceiver and a receiver optically linked to the second transceiver.

13. An in-band full-duplex (IBFD) free-space optical (FSO) system comprising:
   a first transceiver and a second transceiver, each of the first transceiver and the second transceiver comprising;
      a square-shaped transceiver plane comprising a two-dimensional array;
      a plurality of transmitters positioned to occupy a portion of the array, wherein the plurality of transmitters are positioned to form a square having four corners within the array and an interior area and further within the interior area at one of the four corners of the square; and
      a plurality of receivers positioned within the interior area formed by the square on the array;
   wherein the plurality of transmitters and the plurality of receivers of the first transceiver and the plurality of transmitters and the plurality of receivers of the second transceiver perform IBFD communication by simultaneously transmitting and receiving optical signals in a same frequency band.

14. The FSO system of claim 13, further comprising a defocal lens assembly positioned to receive a beam from one or more of the plurality of transmitters of the first transceiver and the second transceiver, wherein an optical link distance between the defocal lens assembly and the one or more of the plurality of transmitters of the first transceiver and the second transceiver is adjustable.

\* \* \* \* \*